Nov. 29, 1955

J. M. PESTARINI 2,725,490

ELECTRIC POWER SYSTEM

Filed Feb. 2, 1953

3 Sheets-Sheet 1

INVENTOR
Joseph M. Pestarini
BY
Philip G. Hilbert
ATTORNEY

Nov. 29, 1955

J. M. PESTARINI 2,725,490

ELECTRIC POWER SYSTEM

Filed Feb. 2, 1953

3 Sheets-Sheet 2

INVENTOR
Joseph M. Pestarini
BY
Philip G. Hilbert
ATTORNEY

Nov. 29, 1955   J. M. PESTARINI   2,725,490
ELECTRIC POWER SYSTEM
Filed Feb. 2, 1953                         3 Sheets-Sheet 3

INVENTOR
Joseph M. Pestarini
BY
Philip G. Hilbert
ATTORNEY

United States Patent Office 2,725,490
Patented Nov. 29, 1955

2,725,490

ELECTRIC POWER SYSTEM

Joseph M. Pestarini, Staten Island, N. Y.

Application February 2, 1953, Serial No. 334,671

13 Claims. (Cl. 307—80)

This invention relates to electric power systems. More particularly, the invention concerns systems which convert mechanical power derived from prime movers rotating at variable speed, into alternating current, the frequency of which is regulated to provide predetermined values which may be kept constant.

The invention is particularly applicable where the mechanical power is derived from fluctuations in the levels of large bodies of water, such as the tidal effects which are used to drive hydraulic turbines. For the purpose of illustration, the invention will be described in connection with such tidal power sources, it being understood that the systems embodying the invention may encompass other sources of mechanical power distinguished by variable speed outputs.

Accordingly, an object of this invention is to provide an electric power system having improved operational characteristics and adapted to convert mechanical power at variable speed into a maximum electrical output.

Another object of this invention is to provide a system of the character described, in which the construction of the source of mechanical power, such as a hydraulic turbine, may be simple and rugged, and adapted to be correlated with dynamo electric machines interrelated for maximum efficiency of operation without the need for providing the turbine with special or sensitive control equipment.

A further object of this invention is to provide a system of the character described, which eliminates the need for close speed regulation of the prime mover, the prime mover being adapted to rotate at a speed approximating the optimum speed as determined by the characteristics of the input to the prime mover without affecting either the value of the electric power output of the system or the efficiency of the prime mover.

Still another object of this invention is to provide a power system for supplying alternating current to a network which permits simple and efficient control of the real and reactive power output.

Other objects of this invention will be obvious and in part hereinafter pointed out.

Figure 1:
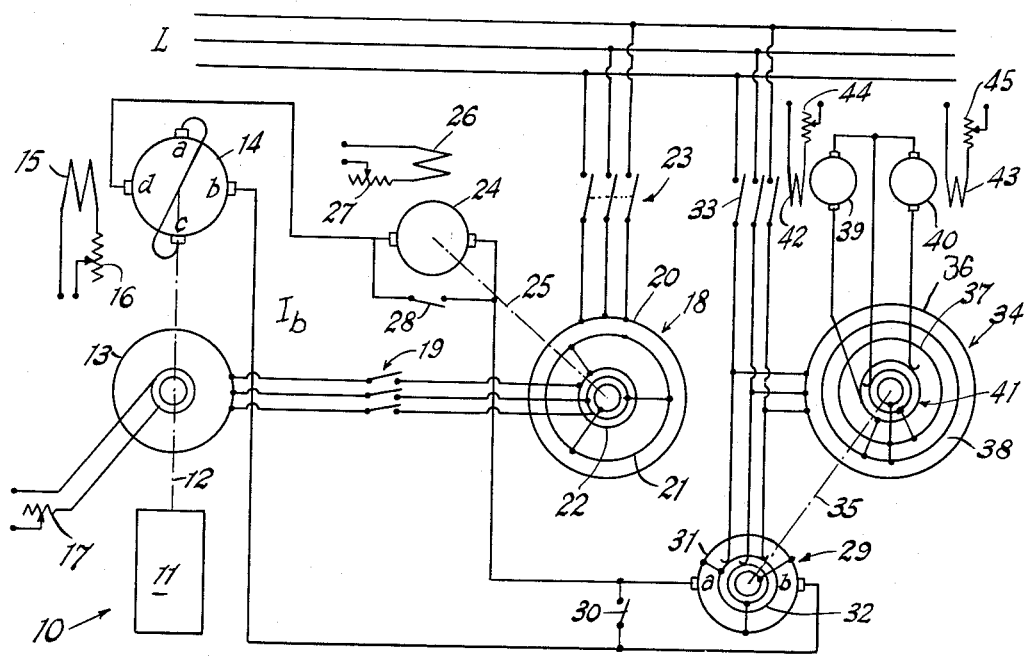
Figure 3:
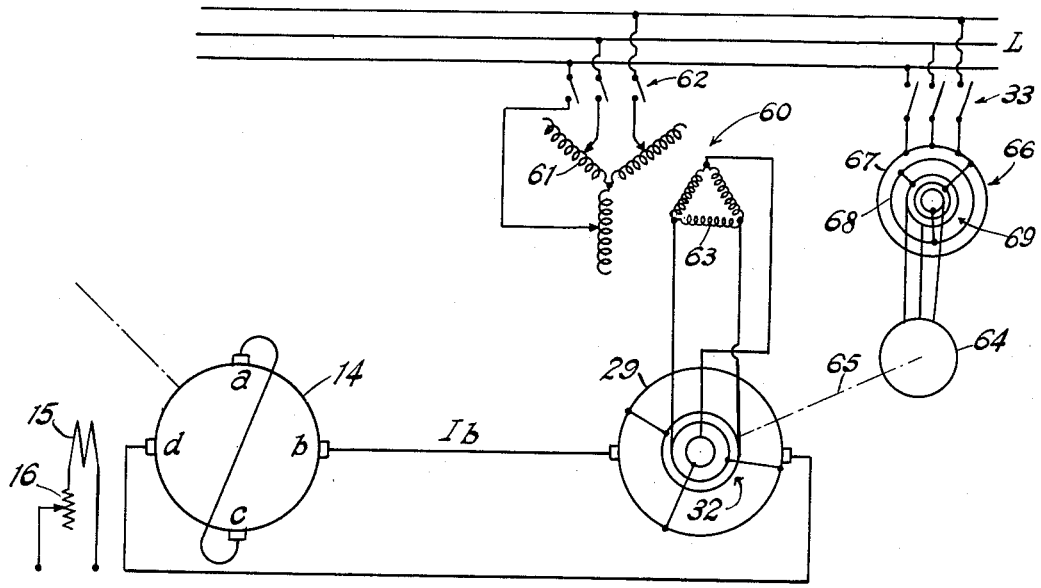
Figure 2:
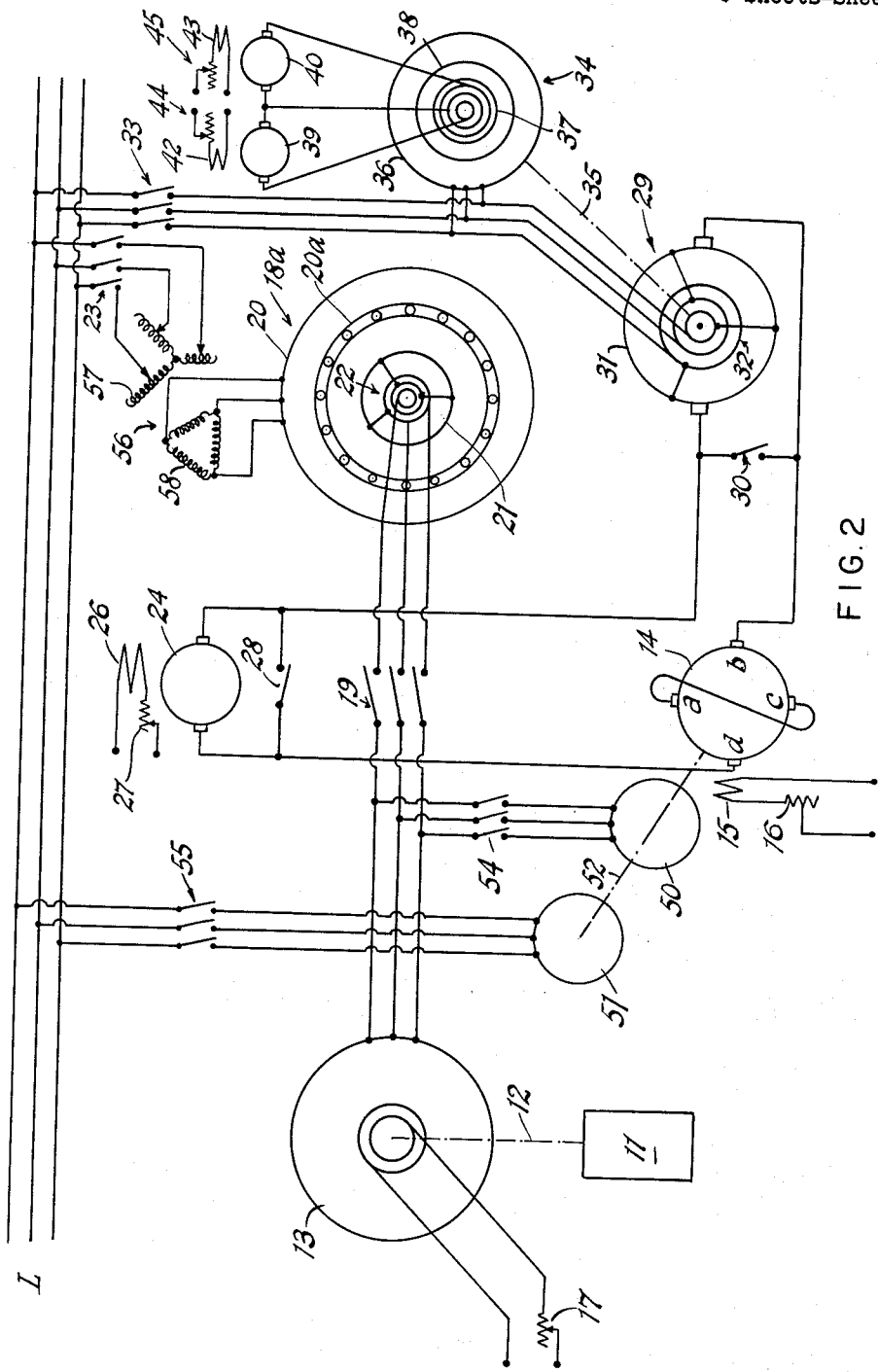
Figure 4:
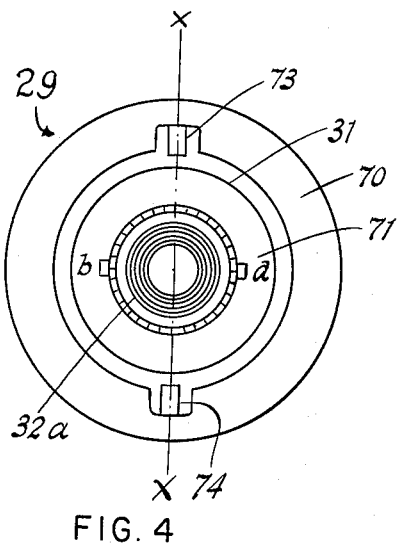
Figure 5:
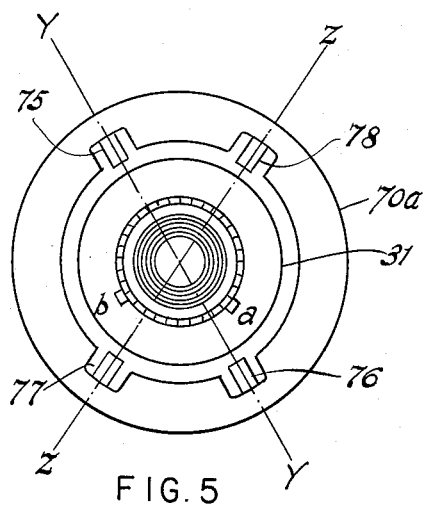
Figure 6:
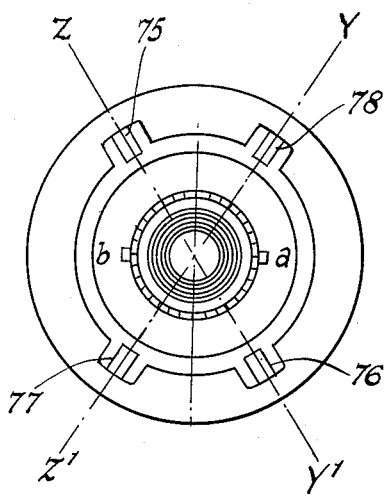
Figure 7:
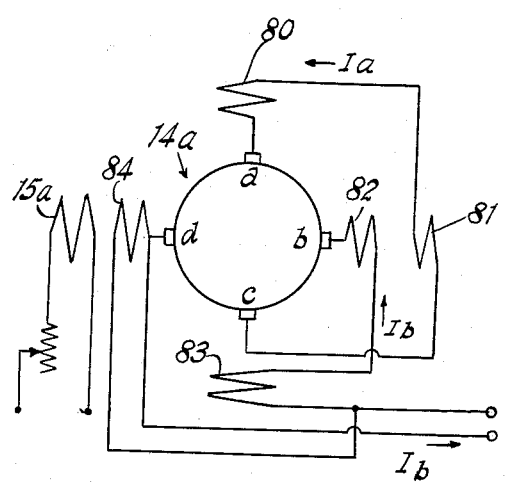

In the drawings, Fig. 1 is a schematic diagram of an electric power system embodying the invention; Figs. 2 and 3 show modifications thereof; Fig. 4 is a schematic showing of a transformer metadyne forming a part of the system; Figs. 5 and 6 illustrate modified forms thereof; and Fig. 7 is a schematic circuit diagram of a metadyne generator forming part of the system and showing the control windings thereof.

Referring in detail to the drawings, and particularly to Fig. 1, 10 designates a power system embodying the invention. The same comprises a source of mechanical power which may take the form of a hydraulic turbine 11 adapted to be driven by tidal power and having an output shaft 12 rotating at variable speeds. Coupled to shaft 12 is an alternator 13 which provides a system of alternating currents at essentially variable frequencies.

Also coupled to shaft 12 is a dynamo electric machine 14 of the generator metadyne type, such machine being adapted to provide a direct current of constant intensity, indicated as $I_b$ and independent of the rotational speed of shaft 12.

The generator metadyne 14 comprises an armature having associated therewith a pair of short circuited primary brushes $a$, $c$; a pair of secondary brushes $b$, $d$ displaced with respect to the primary brushes; and a control stator winding 15 whose magnetic axis is coincident with the secondary commutating axis of the machine. The control winding 15 is independently energized and its ampere turns is determined by means of a rheostat 16, thereby regulating the intensity of the output current $I_b$. The voltage produced by the alternator 13 is regulated through the control of the excitation current supplied thereto, by means of rheostat 17, for the purpose hereinafter appearing.

The three phase alternating current output of the alternator 13 is supplied to a frequency transformer 18, through a switch 19. The transformer 18 comprises a pair of relatively rotatable members made up of laminated magnetic material and each bearing a three phase winding, the stator winding being indicated at 20 and the rotor winding at 21. The rotor winding is connected in circuit with the output of alternator 13 by way of slip rings 22 while the stator winding is connected to a three phase alternating current supply line L, through a circuit breaker 23.

The rotor of transformer 18 is driven by a dynamo 24 through a shaft coupling 25. Dynamo 24 is connected in circuit with the secondary output brushes $b$, $d$ of the generator metadyne 14 and is thus energized with the constant intensity current output of said generator indicated as $I_b$. Dynamo 24 includes an independently energized excitation winding 26 with its excitation regulated by rheostat 27. A short circuiting switch 28 connected across the brushes of the dynamo may be used to render the same inoperative when desired.

The system further comprises a special power transformer 29 of the metadyne type which is connected in circuit with the generator metadyne 14, through its brushes $a$, $b$. A short circuiting switch 30 connected across said brushes, is adapted to render the transformer inoperative when desired.

The transformer 29 comprises a stator distinguished by the omission of any main windings, as hereinafter described in detail. The transformer further includes a rotor member provided with a direct current winding 31 associated with a commutator provided with brushes $a$, $b$ which are connected to machine 14. Winding 31 is also connected to the line L through slip rings indicated at 32 by way of a circuit breaker 33.

The transformer 29 has its rotor coupled to a synchronous motor 34 by a shaft coupling 35. The motor 34 comprises an armature winding 36 connected to the line L and an inductor having a pair of field windings 37, 38. The field windings are respectively energized by exciters 39, 40 through slip ring connections indicated at 41. The exciters 39, 40 have independently energized control field windings 42, 43, respectively, which are regulated by rheostats 44, 45, respectively.

The inductor of motor 34 is cylindrical in form and each of its windings 37, 38 creates ampere turns sinusoidally distributed along the air gap of the motor, thereby providing fluxes similarly distributed. The flux created by winding 38 is angularly displaced by 90 electrical degrees with respect to the flux created by winding 37, so that the resultant flux produced by the inductor may be angularly shifted as desired, by means of the rheostats 44, 45. In this manner, the resultant flux may be shifted to any angular position relative to a radial plane selected relative to the shaft 35 as a reference plane.

Assume that the turbine 11 is operated by tides having a maximum level of $h_m$ and an arbitrarily selected lower level $h_i$, where $h_m=4h_i$. The rotational speed of shaft 12 indicated as $v$, at which the mechanical efficiency of the turbine is at a maximum for a given tidal level indicated as $h$, may be referred to as the optimum speed for such level. Let $v_m$ and $v_i$ be the optimum shaft speeds corresponding respectively to levels $h_m$ and $h_i$, the speed relationships being approximately $v_m=2v_i$ since the values of the optimum speed varies approximately as the square root of the tidal levels.

The alternator 13 may have such a number of poles as provides a pulsation or angular frequency indicated as $w$ which is substantially equal to the pulsation $w_0$ of the line L, for a speed $v_0$ which is greater than $\frac{1}{2}(v_m+v_i)$. The nominal power of the generator metadyne 14, the dynamo 24 and the transformer metadyne 29 may be substantially equal to about one fifth of the maximum power $P_m$ developed by the turbine 11 at tidal level $h_m$.

It is apparent that the tide having attained a level $h_m$, thereafter the level will progressively decrease in a single cycle, yet the speed of the turbine may be kept constant at the value $v_0$ so long as the mechanical efficiency of the turbine does not change appreciably with the decrease in tidal level. In such case, the alternator 13 may be connected directly to the line L by suitable switching means, not shown.

When the tidal level decreases to points wherein the mechanical efficiency of the turbine does change appreciably, the alternator 13 is no longer directly connected to line L, and the operation of the system may be divided into two phases. In the first phase, tidal level $h$ is above that of $h_i$ and in the second phase, tidal level $h$ is below that of $h_i$.

During the first phase of operation, switches 19, 23 and 30 are closed and switches 28 and 33 are opened. In this case, the alternator 13 supplies a system of currents having a pulsation $w$ extending between the pulsation $w_m$ corresponding to shaft speed $v_m$ and the pulsation $w_i$ correspond to shaft speed $v_i$, and passing through pulsation $w_0$ of the line L. The power of turbine 11 passes from its maximum to a value $P_i$ corresponding to tidal level $h_i$.

When the pulsation $w$ is different from the line pulsation $w_0$, the currents at pulsation $w$ energize the rotor winding 21 of transformer 18 and produce a flux $\phi$ rotating with respect to said rotor at an angular speed $$\frac{w}{p}$$

where $2p$ is the number of poles in machine 18. Similarly, the polyphase currents of line L energize the stator winding 20 of machine 18 and produce a flux $\phi_1$ rotating with respect to the stator at an angular speed of $$\frac{w_0}{p}$$

If the rotor rotates with an angular speed of $$\frac{w_0-w}{p}$$

the fluxes $\phi$ and $\phi_1$ will rotate at the same speed with respect to the stator. If the fluxes coincide and have the same amplitude, neither real or reactive power will be supplied by the alternator 13 to line L and the dynamo 24 rotates without load. In such case, the field excitation current of the dynamo must be zero.

If the dynamo 24, upon excitation, creates a torque T in such a direction as to cause flux $\phi$ to lead flux $\phi_1$ by an angle $\alpha$, a real power will be supplied by the turbine 11 to the line L, such power having the value $$T\frac{w_0}{p}$$

The real power supplied by alternator 13 is then equal to $$T\frac{w}{p}$$

and the power supplied by the dynamo 24 is $$T\frac{w-w_0}{p}$$

Therefore, if $w<w_0$, the dynamo operates as a motor and the generator metadyne 14 supplies power. If $w>w_0$, the dynamo 24 operates as a generator and supplies power to metadyne 14.

The dynamo 24 may be readily operated to develop a constant torque of positive or negative value and independent of its speed by setting the proper value of the current energizing the field winding 26 through suitable regulation of rheostat 27. The generator metadyne 14 will then supply or absorb electric power in relation to dynamo 24, transforming the equivalent mechanical power from shaft 12. Thus, if $w>w_0$, the mechanical power supplied by the turbine is equal to the difference between the power supplied by the alternator 13 and the power absorbed by the generator metadyne 14.

The control of the transmitted reactive power from the alternator 13 to the line L, is obtained by regulation of the rheostat 17 which controls the excitation current supplied to the alternator.

The ratio of the maximum power of the generator metadyne 14, expressed as $P_g$, to the maximum power of the turbine 11, expressed as $P_m$, may be approximately determined as follows. Let $T_m$ be the constant torque developed by dynamo 24 when the tidal level $h=h_m$, the dynamo will then create a power equal to $$T_m\left(\frac{w_m-w_0}{p}\right)$$

Also, $$P_m=T_m\frac{w_0}{p}$$

Therefore, the maximum power $$P_g=P_m\left(\frac{w_m-w_0}{w_0}\right)$$

The pulsation $w_0$ of line L may be equal to $$k\left(\frac{w_m+w_i}{2}\right)$$

where $k$ and $w_i$ must be selected by way of calculations based on known factors for a particular case. For example, if $w_i=.5w_m$ and $k=1.0$, then $P_g=\frac{1}{3}P_m$. If $w_i=.5w_m$ and $k=1.1$, the $P_g=\frac{1}{5}P_m$.

With the second phase of operation of the system, wherein $h<h_i$, the power developed by turbine 11 varies between zero and approximately $\frac{1}{5}$ $P_m$, the values of $w_i$ and $k$ being taken from the second example given above.

During the second phase of operation, the switches 19, 23 and 30 are opened and switches 28 and 33 are closed. The generator metadyne 14 absorbs all the mechanical power delivered by the turbine 11 and transforms the same into direct current having a constant value $I_b$. Such current traversing the power transformer 29 creates a flux $\phi_2$ along the commutating axis of brushes $a$, $b$ thereof. At the same time, the polyphase current supplied to the same armature winding of machine 29 from the line L, creates a flux $\phi_3$ which is fixed in space due to the synchronous rotation of said armature winding by the motor 34.

The angular shift between the fluxes $\phi_3$ and $\phi_2$ is dependent upon the angular position of the resultant flux of the inductor of motor 34 with respect to its shaft 35. Such angular shift may be determined by the setting of rheostats 44, 45. For a predetermined setting of said rheostats, the flux $\phi_3$ will have a component $\phi_4$ which is normal to the commutating axis of the transformer brushes $a$, $b$ and a component $\phi_5$ which is coincident with said commutating axis. The flux component $\phi_4$ produces an electromotive force $E_b$ between the brushes $a$, $b$, which multiplied by the constant current $I_b$, determines the real power $EI_b$, produced by the turbine 11 and supplied to line L.

The flux component $\phi_5$ is similarly proportional to the reactive power supplied. Therefore, the setting of rheostats 44, 45 determines the value of both the real and reactive power supplied to line L.

Since the transformer 29 has no main stator winding, it does not develop a torque and accordingly, the motor 34 need only develop the minimum torque to overcome friction losses and its size may be small as compared to the size of the transformer.

The transmission of reactive power to line L is important in order to maintain stability in the system, but does not require any real power from the generator metadyne 14. Accordingly, even during the first phase of system operation, the machine 29 may be permitted to operate, keeping the switch 30 open.

In Fig. 2 is shown a power system illustrating a modified form of the invention. The arrangement is similar to that shown in Fig. 1, except for the changes indicated. The generator metadyne 14 is driven by a pair of synchronous motors 50, 51 coupled together and to the metadyne by a shaft 52. The motor 50 is connected to the alternator 13 through a switch 54 and the motor 51 is connected to the line L through a switch 55. The motor 50 has a smaller number of poles than motor 51 so as to keep the rotational speed of the metadyne 14 high, even when $w<w_i$. During the first phase of operation switch 54 is open and switch 55 is closed. This is then reversed for the second phase of operation.

The transformer 18a is similar to transformer 18 except that it is provided with a third member 20a having a squirrel cage winding and freely rotatable between the members bearing windings 20, 21. The member 20a has a damping action and tends to prevent hunting.

The transformer 18a is connected to the line L through a transformer 56 which comprises a primary winding 57 having star connections and provided with variable taps, such winding being connected to the line through switch 23 and a secondary winding 58 with delta connections, which is connected to transformer winding 20. The regulation of the voltage output of transformer 56 provides a supplemental control of the reactive power supplied and is adapted to act in conjunction with the operation of rheostat 17 which controls the excitation of the alternator 13. These controls may be used separately or in combination.

In Fig. 3 is shown a further modified form of the invention. The system shown is similar to that of Figs. 1 and 2, except as indicated. The showing of the turbine 11, alternator 13 and transformers 18 or 18a, and their respective connections, has been omitted for the purpose of simplification.

The power transformer 29 is connected to the line L through a transformer 60 having a variable tap primary winding 61 connected to the line through a switch 52, said winding having star connections, and a secondary winding 63 connected to the transformer armature through slip rings 32, said winding having delta connections.

The transformer 29 is driven by a synchronous motor 64 through a shaft coupling 65, such motor having salient poles. The motor is connected to the line L through a phase shifting device 66 and switch 33. The device 66 comprises a pair of coaxial members 67, 68 which are arranged for relative angular adjustment. The members 67, 68, which are somewhat similar in construction to the members of an asynchronous motor, respectively bear a winding which is connected to the line L and a winding adapted to be connected to the motor 64 by way of slip rings 69.

Upon suitable regulation of the relative angular position of the phase shifter members 67, 68, control of the reactive and real power transmitted by the machine 29 to the line L, is effected. The supply of real power may also be controlled through the regulation of the constant current $I_b$ which is supplied by generator metadyne 14. Furthermore, the supply of reactive power may also be controlled by way of the variable transformer 60. The several forms of control may be utilized independently or in any desired combination thereof. It is understood that the generator metadyne 14 may be driven from the turbine shaft 12, as shown in Fig. 1 or by the motor shaft 52 as shown in Fig. 2.

Further control may be obtained by the use of a phase shifting device somewhat similar to that shown in Fig. 3 but of increased capacity, which is inserted between machine 29 and the line L.

In Fig. 4 is shown structural details of the power transformer 29. Here, the stator of the machine indicated at 70, has no main winding, as previously stated, while the rotor 71 bears winding 31 and is provided with a commutator having diametrically related brushes $a$, $b$. The winding pitch of the rotor winding is diametrical. The stator 70 is formed with a pair of diametrically aligned slots which are coincident with the commutating axis indicated by the line $x$—$x$.

Commutating poles 73, 74 are respectively positioned in the said slots and have the conventional commutating coils, not shown, mounted thereon for connection with the brushes $a$, $b$, in a manner known in the art. The winding 31 is adapted to be connected to the line L through slip rings, such as those indicated at 32a, the winding being preferably wound with six phases and therefore requiring six slip rings, to reduce losses in the machine and to keep the same to a minimum size.

In Fig. 5, the stator 70a is similar to stator 70 except that the same is formed with two pairs of diametrically aligned slots which are angularly displaced in accordance with the location of brushes $a$, $b$ which are no longer in diametrically opposed relation; the winding pitch still being diametrical. Commutating poles 75, 76; 77, 78 are positioned in the stator slots and receive the commutating coils, not shown, as previously described. There are now provided two commutating axes as indicated by the lines $y$—$y$ and $z$—$z$.

With the arrangement shown in Fig. 5, there is a better distribution of the overlapping direct and alternating currents in the armature winding 31. Furthermore, there is a reduction in the copper losses and the commutation is more efficient.

In Fig. 6, the stator construction is similar to that shown in Fig. 5, but the brushes $a$, $b$ are located in diametrical relation and the winding pitch is fractional. Here, the commutating axis corresponding to brush $a$ is indicated by the lines $y$—$y'$ while the commutating axis corresponding to brush $b$ is indicated by the lines $z$—$z'$. The stator is accordingly provided with slots and the commutating poles 75, 76; 77, 78.

It is apparent that the angular shift between the commutating axis $x$—$x$, as shown in Fig. 4, and the flux $\phi_3$ due to the alternating current of line L, controls the supply of real power. In the cases shown in Figs. 5 and 6, the angular shift of flux $\phi_3$ is determined in respect to the bisectors of lines $y$—$y$, $z$—$z$ and lines $y$—$y'$ and $z$—$z'$.

In Fig. 7, is shown a modified form of the generator metadyne 14a. Here, the operation of the machine is improved by the optional use of several control stator windings. Thus, there is provided a primary, series connected winding 80 which is energized by the primary current indicated as $I_a$ and creates a flux aligned with the flux created by the armature ampere turns due to the same current.

Also, there is a primary stabilizing winding 81 energized by primary current $I_a$ and is adapted to produce an electromotive force between the primary brushes $a$, $b$ which is in opposition to said current. An undercompensating winding 82 in the secondary brush circuit, is energized by the secondary current $I_b$ and is adapted to only partially compensate the flux produced by the armature ampere turns due to said secondary current and thus reduces the power required by control winding 15a for regulating the intensity of current $I_b$.

A secondary stabilizing winding 83, which is energized by the secondary current, produces an electromotive force between the brushes b, d and in oppositon to said secondary current. A secondary winding 84, shunt connected across the brushes b, d, aids with its ampere turns, the ampere turns of the control winding 15a, to maintain the intensity of the current $I_b$ at a constant value, independently of the load. It is understood that the several windings 80, 81, 82, 83 and 84 may be used independently or in combination, to attain the desired performance characteristic of the machine.

It is understood that any dynamoelectric machine adapted to provide constant direct current, may be used in lieu of generator metadyne 14, although machines of the metadyne type are preferred in view of their excellent dynamic behaviour.

It has been assumed that the network connected to line L, is of sufficient power as to be able to impress its own frequency on the system. In cases where the network is of a lesser power, the frequency of the network will be determined by the speed of the dynamo 24 during the first phase of system operation and the speed of motor 34 during the second phase of operation. In such case, the speed of said machines may be stabilized by methods well known in the art.

It is understood that all matter herein set forth or shown in the accompanying drawings, is to be interpreted as illustrative and not in a limiting sense.

Having thus described my invention, I claim as new and desire to protect by Letters Patent:

1. A power system for providing constant frequency alternating current to a network, comprising a source of mechanical power including a shaft rotating at variable speed, a variable frequency alternator coupled to said shaft, a frequency transformer in circuit with said alternator and said network, a direct current generator for providing constant current, means for driving said generator, a direct current dynamo in circuit with said generator for driving said frequency transformer, a rotating power transformer in circuit with said generator and said network, a synchronous motor for driving said power transformer, means for controlling the angular position of the resultant flux produced by the inductor of said motor relative to the axis of rotation of said motor, and switch means selectively operable to connect said alternator and frequency transformer to said network for one predetermined range of shaft speeds and to connect said power transformer to said network for another predetermined range of shaft speeds.

2. A system as in claim 1 wherein said generator includes a stator winding for controlling the intensity of the output current thereof and said dynamo includes an excitation winding for controlling the torque thereof.

3. A system as in claim 1 and further including means for coupling said generator to said shaft.

4. A system as in claim 1 wherein the means for driving said generator comprises a second synchronous motor in circuit with said network.

5. A system as in claim 1 wherein the means for driving said generator comprises a pair of coupled synchronous motors respectively connected in circuit with said network and said alternator, said pair of motors having different numbers of poles, and switch means for selectively connecting said pair of motors with their energizing means.

6. A system as in claim 1 wherein said synchronous motor comprises an inductor having a pair of field windings arranged to produce fluxes displaced from each other, and controllable excitation means in circuit with each of said field windings.

7. A system as in claim 1 wherein said frequency transformer comprises stator and rotor members respectively provided with polyphase windings which are respectively connected in circuit with said network and said alternator, and a squirrel cage member arranged for free rotation between said members.

8. A system as in claim 1 and further including phase shifting means comprising a pair of members arranged for relative adjustable angular movement and having windings respectively associated therewith, one of said last mentioned windings being connected to said network and the other of said last mentioned windings being connected to said synchronous motor.

9. A system as in claim 1 wherein said alternator includes a controllable source of excitation current, and further including means for varying the voltage input of the alternating current supplied to said frequency transformer.

10. A system as in claim 1, wherein said power transformer comprises a rotor coupled to said synchronous motor and having a winding associated with a commutator provided with a pair of brushes and slip rings, said pair of brushes being connected in circuit with said generator and said slip rings being connected in circuit with said network.

11. A system as in claim 10, wherein said power transformer further comprises a stator provided with at least one pair of commutating poles in diametrical relation and located in predetermined relation to said pair of brushes whereby to control the supply of real power in said system.

12. A system as in claim 1 wherein said generator comprises a metadyne including an armature having associated therewith a pair of primary brushes and a pair of secondary brushes displaced therefrom, said primary brushes being essentially short circuited, and a plurality of stator control windings, one of said control windings being independently energized to regulate the intensity of the current output of said metadyne.

13. A system as in claim 12 wherein a second and third control winding are respectively connected in the primary and secondary brush circuits for stabilizing the operation of said metadyne and a fourth undercompensating control winding is connected in the secondary brush circuit.

No references cited.